United States Patent
Elson et al.

(10) Patent No.: US 11,860,913 B2
(45) Date of Patent: *Jan. 2, 2024

(54) STREAMING REAL-TIME DIALOG MANAGEMENT

(71) Applicant: GOOGLE LLC, Mountain View, CA (US)

(72) Inventors: David Elson, Port Washington, NY (US); Christa Wimberley, Mountain View, CA (US); Benjamin Ross, New York, NY (US); David Eisenberg, New York, NY (US); Sudeep Gandhe, Sunnyvale, CA (US); Kevin Chavez, Palo Alto, CA (US); Raj Agarwal, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,270

(22) Filed: Dec. 23, 2022

(65) Prior Publication Data
US 2023/0132020 A1    Apr. 27, 2023

Related U.S. Application Data

(63) Continuation of application No. 17/114,350, filed on Dec. 7, 2020, now Pat. No. 11,537,646, which is a
(Continued)

(51) Int. Cl.
*G06F 16/16* (2019.01)
*G06F 16/332* (2019.01)
(Continued)

(52) U.S. Cl.
CPC .......... *G06F 16/3329* (2019.01); *G06F 16/00* (2019.01); *G06F 16/3344* (2019.01);
(Continued)

(58) Field of Classification Search
CPC .......................... G06F 16/3329; G06F 16/3344
See application file for complete search history.

(56) References Cited

U.S. PATENT DOCUMENTS 10,319,042 B2 * 6/2019 Arvapally .............. G06Q 40/12
10,504,521 B1 * 12/2019 Taubman ............ G06F 16/9535
(Continued)

FOREIGN PATENT DOCUMENTS

| CN | 103631853 | 3/2014 |
|----|-----------|--------|
| CN | 106227779 | 12/2016 |
| EP | 1343144 | 9/2003 |

OTHER PUBLICATIONS

European Patent Office; Communication pursuant to Article 94(3) EPC issued in Application No. 17794470.9; 5 pages, dated Jan. 30, 2023.
(Continued)

*Primary Examiner* — Baoquoc N To
(74) *Attorney, Agent, or Firm* — Gray Ice Higdon

(57) ABSTRACT

Systems and methods provides for dialog management in real-time rather than turn taking. An example method included generating first candidate responses to triggering event. The triggering event may be receipt of a live stream chunk for the dialog or receipt of a backend response to a previous backend request for a dialog schema. The method also includes updating a list of candidate responses that are accepted or pending with at least on of the first candidate responses, and determining, for the triggering event, whether the list of candidate responses includes a candidate response that has a confidence score that meets a triggering threshold. The method also includes waiting for a next triggering event without providing a candidate response when the list does not include a candidate response that has a confidence score that meets the triggering threshold.

20 Claims, 6 Drawing Sheets

Related U.S. Application Data continuation of application No. 15/783,290, filed on Oct. 13, 2017, now Pat. No. 10,860,628.

(60) Provisional application No. 62/459,820, filed on Feb. 16, 2017.

(51) Int. Cl.

| | |
|---|---|
| *G06N 20/00* | (2019.01) |
| *G06F 16/33* | (2019.01) |
| *G10L 15/22* | (2006.01) |
| *G06Q 10/10* | (2023.01) |
| *G06F 16/00* | (2019.01) |
| *G06F 40/30* | (2020.01) |
| *G06F 40/205* | (2020.01) |

(52) U.S. Cl.
CPC ............ *G06F 40/30* (2020.01); *G06N 20/00* (2019.01); *G06Q 10/10* (2013.01); *G10L 15/22* (2013.01); *G06F 40/205* (2020.01)

(56) References Cited

U.S. PATENT DOCUMENTS

| | | | |
|---|---|---|---|
| 10,860,628 | B2 | 12/2020 | Elson et al. |
| 2012/0007889 | A1 | 3/2012 | Chu-Carroll et al. |
| 2012/0078889 | A1 | 3/2012 | Chu-Carroll et al. |
| 2014/0006012 | A1 | 1/2014 | Zhou et al. |
| 2014/0163959 | A1 | 6/2014 | Hebert et al. |
| 2014/0310001 | A1 | 10/2014 | Kalns et al. |
| 2014/0365209 | A1 | 12/2014 | Evermann |
| 2016/0171114 | A1 | 6/2016 | Whipp et al. |
| 2016/0188565 | A1 | 6/2016 | Robichaud et al. |
| 2016/0196110 | A1 | 7/2016 | Yehoshua et al. |
| 2017/0009831 | A1 | 1/2017 | Iwasaki et al. |
| 2017/0032791 | A1 | 2/2017 | Elson et al. |
| 2021/0089565 | A1 | 3/2021 | Elson et al. |

OTHER PUBLICATIONS

China Intellectual Property; Notice of Allowance issued in Application No. 201711035649.7; 5 pages, dated Nov. 25, 2021.

Deutsches Patent Office; Examination Report issued in Application No. 102017125001.8; 18 pages, dated May 14, 2021.

China Intellectual Property; Notice of Office Action issued in Application No. 201711035649.7; 5 pages, dated Jun. 2, 2021.

United Kingdom Intellectual Property Office; Examination Report issued in Application No. GB1717421.0; 6 pages, dated Mar. 24, 2021.

European Patent Office; International Preliminary Report on Patentability of PCT Ser. No. PCT/US2017/056720; 19 pages, dated Mar. 14, 2019.

International Search Report and Written Opinion of PCT Ser. No. PCT/US2017/056720; 14 pages dated Jan. 19, 2018.

United Kingdom Intellectual Property Office; Examination Report issued in Application No. 1717421.0 dated Mar. 13, 2018.

\* cited by examiner

STREAMING REAL-TIME DIALOG MANAGEMENT

BACKGROUND

Dialog management is the problem of tracking a user's conversation with an electronic assistant. The assistant waits for the user to finish speaking, computes a response, and then provides the response. Such a flow is referred to as turn-taking, as the user takes a turn speaking, the assistant takes a turn, and then user takes a turn, etc. Most electronic assistants deal with one schema at a time, a schema being similar to a task or topic of conversation, like cooking, weather, setting a timer, etc. Assistants that can handle multiple schemas still operate in a turn-taking flow.

SUMMARY

Implementations provide for dialog management in real-time rather than turn taking. A system using a real-time dialog management framework is able to participate in a natural, real-time, bidirectional conversation with a user. Real-time dialog management differs from turn-taking because the system constantly listens to streaming audio and makes decisions about what the user intends to say, what responses may be appropriate, and when to appropriately provide a response. In turn-taking the system generates and provides a response at a specific request from the user; there is no uncertainty about whether to give a response. In contrast, in real-time dialog management, the system may try to predict an appropriate response before receiving a completed request from the user, e.g. a request implied after a period of user silence. In predicting, the system must handle multiple dialog paths, which are updated, pruned, and generated, as the system receives further input from the user. The real-time dialog management framework balances processing resources (wasted processing cycles calculating a response that is never provided) with delay. A real-time dialog management framework can enable an electronic assistant to formulate responses faster than in turn-taking, to provide back-channel feedback at appropriate times, and can offer assistive responses, or in other words, predictive responses that complete a user's thought. Thus, a real-time dialog management framework better simulates natural conversations than a turn-taking dialog. A real-time dialog management framework that includes a dialog mixer that handles multiple schemas enhance the simulation of a more natural conversation. A dialog that is real-time, bi-directional, and predictive improves the electronic assistant interface.

According to certain aspects, a method, which may be implemented by one or more processors, includes generating first candidate responses to a triggering event. The triggering event may be receipt of a live-stream chunk for the dialog or receipt of a backend response to a previous backend request for a dialog schema. A "backend response" is a response from a backend system and/or a dialog manager. The method also includes updating a list of candidate responses that are accepted or pending with at least one of the first candidate responses, and determining, for the triggering event, whether the list of candidate responses includes a candidate response that has a confidence score that meets a triggering threshold. The method also includes waiting for a next triggering event without providing a candidate response when the list does not include a candidate response that has a confidence score that meets the triggering threshold.

According to certain aspects, a method, which may be implemented by one or more processors, includes providing, responsive to receiving a chunk from a real-time dialog stream, the chunk to a dialog mixer, receiving response candidates for the chunk from the dialog mixer, each response candidate being a system response for a dialog schema or a backend request for a dialog schema, and update a rotating list of response candidates using at least one of the response candidates for the chunk. The method further includes ranking the response candidates in the list, each response candidate having a respective confidence score, determining whether the rotating list includes a response candidate with a confidence score that satisfies a triggering threshold, and when the rotating list does not include a response candidate with a confidence score that satisfies the triggering threshold, initiating a backend request represented by a response candidate in the list that has a confidence score that satisfied a ranking threshold and that is not yet an accepted dialog state.

According to certain aspects, a method, which may be implemented by one or more processors, includes receiving a triggering event for a real-time dialog, the real-time dialog having an associated dialog beam with a first path, the dialog beam representing dialog states for a real-time dialog with a user, determining that the triggering event starts a new path in the dialog beam, and backtracking in the first path to an ancestor node in the dialog beam. The method also includes starting the new path in the dialog beam from the ancestor node by generating response candidates using a base state represented by the ancestor node and information from the triggering event, where a path in the dialog beam includes one or more accepted or pending response candidates, a response candidate being a system response generated by a dialog schema or a backend request for a dialog schema.

According to certain aspects, a computing system includes at least one processor and memory storing instructions that, when executed by the at least one processor, cause the computing device to perform any of the methods, operations, or processes disclosed herein.

According to certain aspects, a computer program product embodied on a computer-readable storage device includes instructions that, when executed by at least one processor formed in a substrate, cause a computing device to perform any of the disclosed methods, operations, or processes. Another general aspect includes a system and/or a method for streaming real-time, multi-schema dialog management to enhance real-time conversations with a user, substantially as shown in and/or described in connection with at least one of the figures, and as set forth more completely in the claims.

One or more of the implementations of the subject matter described herein can be implemented so as to realize one or more of the following advantages. For example, implementations compute responses faster than turn-based dialog managers. In some implementations the system may generate candidates within 10 milliseconds. This is much faster than conventional turn-taking systems, which typically wait some period of time (e.g., 0.5 milliseconds) before even starting to process the user's dialog turn. As another example, implementations provide more accurate conversation with the user, as the system can provide back-channel feedback, can offer assistance, and can do so more quickly than turn-taking. As a result the call from the user is likely to be completed more quickly than with turn-based dialog managers, because of the reduction in time to generate candidate responses and/or because the more understandable/accurate responses provided eliminate (or at least significantly reduce) the need for the user to repeat or re-phrase a portion of their speech because it was misinterpreted or misunderstood by the electronic assistant. This reduces the length of time for which network resources are committed to the call, reduces power consumption by the user's device (particularly advantageous when the user has a battery-powered device), etc. The provision of more accurate/natural conversation also makes an electronic assistant more user-friendly and easier to use. Moreover, the system can engage in multiple long-term dialogs because the system can track and maintain different paths. Implementations are also nonblocking on remote procedure calls, further improving device performance.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Implementations include systems and methods that read real-time streaming input, e.g. in chunks, maintain a list of response candidates for the input, and decide when to provide one of the response candidates back to the user. The list of responses candidates is a dynamic list in that it is continually updated by adding one or more new response candidates and/or removing (or "pruning") one or more response candidates from the list, and is referred to as a "rotating" list. A dialog host calls a dialog mixer upon a triggering event, which may be return of a back-end request, receipt of new streaming input, or expiration of a window of time (in case there has been no other triggering event within the window). The dialog host maintains one or more paths in a dialog beam, managing diverging paths, pruning paths with low posterior probabilities, and backtracking to start a new path when needed. Streaming input is input that is received in real-time and may include an incomplete request. In other words, implementations begin generating response candidates even before the user has finished speaking. Because the dialog host begins formulating an answer before the user has finished speaking, the dialog host increases the speed at which the electronic assistant can respond to the user. The dialog host includes a ranking and triggering capabilities to decide which, if any, dialog responses to provide to the user as part of a conversation. Deciding when to respond, i.e., deciding not to respond to a particular triggering event, is an important function so that the electronic assistant does not interrupt inappropriately or provide premature suggestions. Implementations track a dialog state for each path of a dialog beam and are able to backtrack or start a new path for the dialog as additional input changes the context of the dialog.

Figure 1:
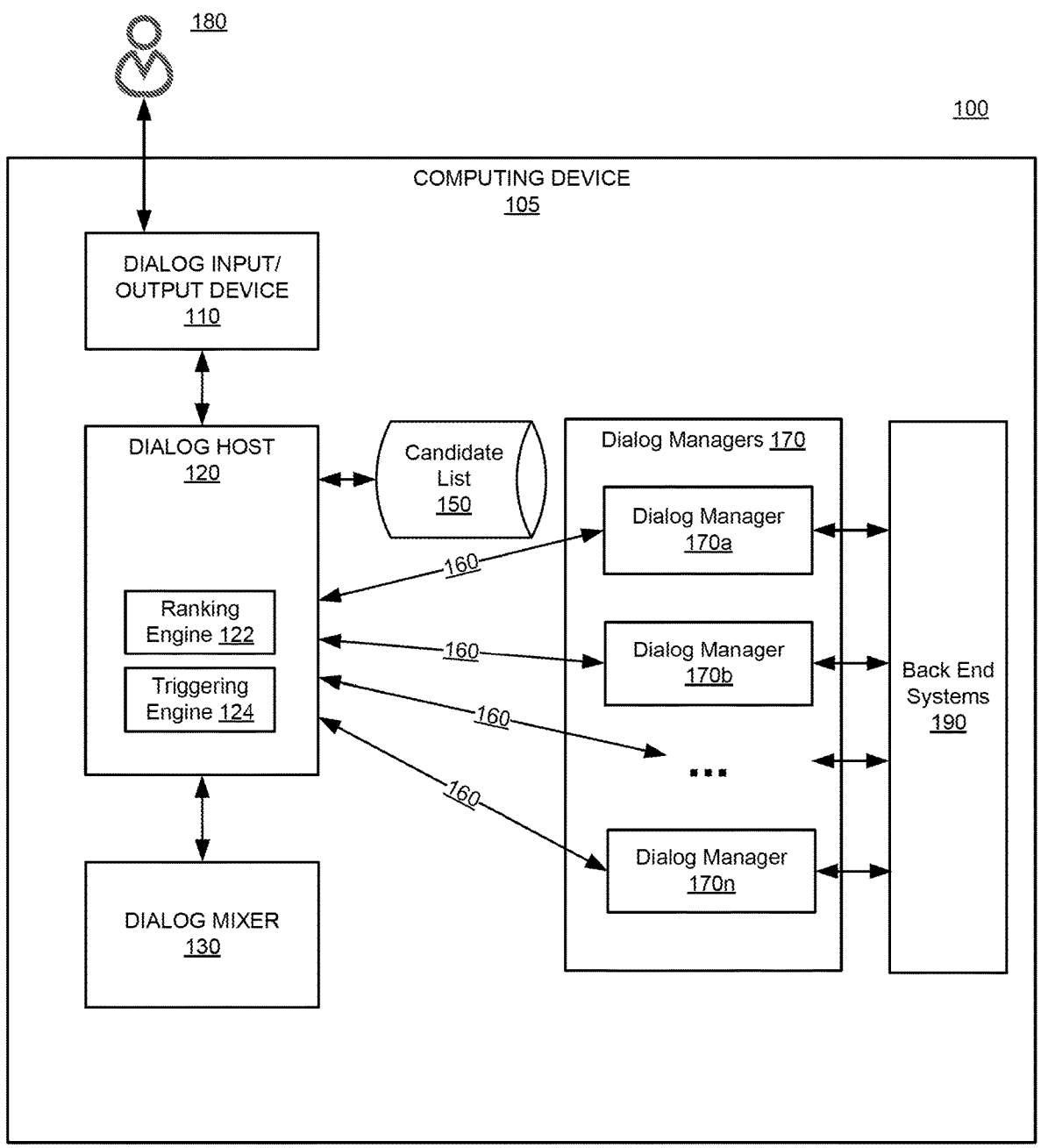
FIG. 1 is a block diagram illustrating an example system in accordance with the disclosed subject matter.

FIG. 1 is a block diagram of a real-time dialog management system in accordance with an example implementation. The system 100 may be used to more accurately simulate a natural conversation with a user, to provide more helpful responses, and to provide responses more quickly than conventional turn-taking dialog managers. The system 100 may also be configured to provide candidate responses from multiple dialog schemas, combining schemas when appropriate. The system 100 is able to process real-time streaming input from the user rather than waiting to process input after the user has completed a command or query. The depiction of system 100 in FIG. 1 is a single computing device but implementations may also move some of the components to a server, making system 100 a client-server system, as illustrated in more detail in FIG. 2. In addition, one or more components may be combined into a single module or engine, and some capabilities of the illustrated components may be performed by separate engines. In some implementations, a user of the computing device may indicate that portions of the processing be performed at a server. Thus, implementations are not limited to the exact configurations illustrated.

Figure 5:
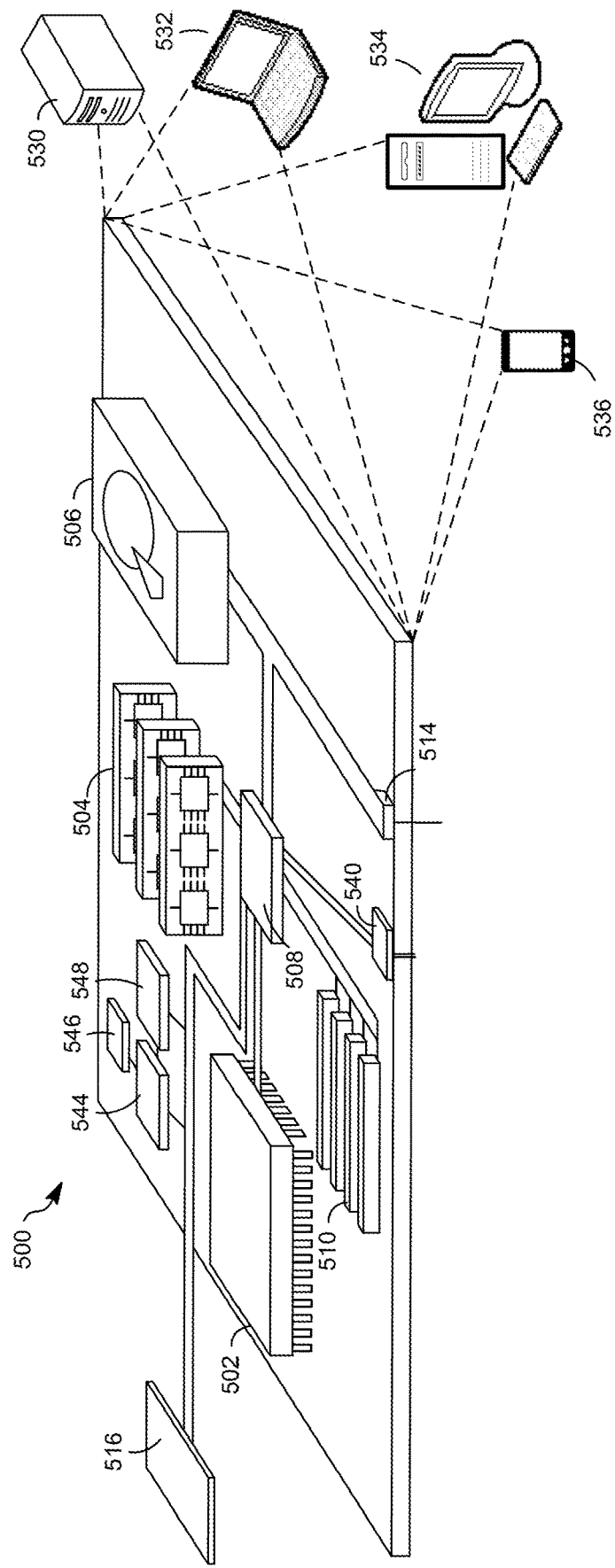
FIG. 5 shows an example of a computer device that can be used to implement the described techniques.

The real-time dialog management system 100 includes a computing device 105. The computing device may be implemented in a personal computer, for example a laptop computer, a smartphone, a wearable device (smart watch, smart glasses, etc.), a game console, a home appliance, etc. The computing device 105 may be an example of computer device 500, as depicted in FIG. 5. The computing device 105 may include one or more processors formed in a substrate (not illustrated) configured to execute one or more machine executable instructions or pieces of software, firmware, or a combination thereof. The processors can be semiconductor-based—that is, the processors can include semiconductor material that can perform digital logic. The computing device 105 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, nonvolatile memory, or a combination thereof, and store modules or engines that, when executed by the one or more processors, perform certain operations. In some implementations, the modules may be stored in an external storage device and loaded into the memory of computing device 105.

The computing device 105 may include dialog input-output devices 110. The dialog input/output devices 110 may include hardware that enables the dialog host 120 to receive input from the user 180 or provide a response to the user 180. Input from the user may be vocal, e.g., in the form of speech. Speech may be provided as streaming input using conventional techniques such as chunking. Input from the user may also be non-vocal, e.g., text, taps, etc., provided by the user. The output can, similarly, be speech-based or text-based. An example of the input/output devices 110 may include a microphone and a speaker. Another example of the input/output devices 100 may be a keyboard (virtual or physical) and a display. The input/output devices 110 may also include modules to convert sounds captured by the microphone to streaming input. The real-time dialog management system 100 is discussed primarily in the context of a spoken conversation using a microphone and speaker but implementations include other conversational modes, such as those held in a messaging application.

The modules of the real-time dialog management system 100 may include a dialog host 120. The dialog host 120 may be configured to obtain or receive input from input/output devices 110. Input can include streaming input. Streaming input captures the user's voice (speech) as a series of chunks, e.g., a few seconds long, and provides the chunks as a file to the dialog host 120. Streaming input is considered verbal input. The dialog host 120 considers each new file as a triggering event and invokes a dialog mixer 130 for each new input. The input may include a sliding window of chunks. For example, the window can include the newly received file and some quantity of previously received files, if they exist. The window may represent the duration of input for which the system has not yet committed to a semantic understanding or a response. In other words, the window may represent the "unstable" portion of the input that the system is using to determine different paths and therefore the system could still backtrack or begin a new path, etc. Once the system provides a response, the system has committed to the input provided and that input becomes "stable". In some implementations, the window may be defined as any input chunks received after providing a most recent response. In some implementations, the window can be defined in terms of a time period, e.g., seconds, fractions of a second, etc. Thus, older files become too old to be included in the window.

The dialog host 120 may be configured to recognize non-verbal input as a triggering event. Non-verbal input may include a text string, tap inputs, or selections obtained from the user using the input/output devices 110. The dialog host 120 considers such non-verbal input as a triggering event and is configured to invoke the dialog mixer 130 for each new nonverbal input. The dialog host 120 may also consider a rewrite candidate to be triggering event. In some implementations, the system may provide the current input context to an engine that performs various types of resolution, e.g., coreference, ellipsis, etc., on the input. This engine may be a function provided by the dialog host 120 or one of the dialog managers 170. The engine may provide a rewrite candidate, which the dialog host 120 may treat the rewrite candidate like a backend response. The dialog host 120 is configured to call the dialog mixer 130 with the rewrite candidate as new input.

The dialog host 120 also recognizes receipt of a backend response as a triggering event. The dialog host 120 is configured to call the dialog mixer 130 for each backend response received. A "backend response" represents data generated using a dialog manager 170, which may be based on one or more searchable data repositories, e.g., backend systems 190. The data is intended for output by the input/output device 110. A backend response may be provided by a dialog manager 170 in response to a request sent to the dialog manager 170. The backend response thus represents a search result provided by the schema that the particular dialog manager 170 operates on. In other words, in this embodiment a "backend request" to a dialog manager 170 initiates a search of the schema managed by the dialog manager 170 using the input. The "backend response" returned by the dialog manager 170 includes the results of the search. The backend response may be for a request solicited by the dialog host 120. The backend response may also be for a request not solicited by the dialog host 120. For example, in some implementations, a dialog manager 170a may provide one or more other dialog managers (e.g., 170b and/or 170n) with resources, e.g., information or data obtained in response to a request, and the other dialog managers may use some or all of the resources to provide an additional backend response. The backend response includes a proposed system response to the backend request. The system response can be verbal output to be provided by the input/output devices 110 to the user. The system response can alternatively or also be associated with an action that the computing device will perform if the response is provided. For example, the system response may cause the computing device to open an application and perform some function in the application, e.g., adding a new calendar event.

The dialog host 120 may be configured to call the dialog mixer 130 periodically in the absence of other triggering events. For example, if no new input and no backend responses are received within a period of time, e.g., 100 milliseconds, the dialog host 120 may consider this passage of time to be a triggering event and to call the dialog mixer 130. This enables the dialog host 120 to update the rotating list of candidates and to make a new decision about whether to provide one of the candidates as a response to the user via the dialog input/output devices 110.

The dialog host 120 manages a rotating list of candidate responses 150. Each candidate response may be referred to as a dialog. In a real-time streaming dialog environment, a dialog may be represented as a path in a dialog beam. A dialog beam is a beam search where dialog responses are mapped to dialog states. A path in a dialog beam represents the dialog states generated for the same input (e.g., query) from the same base state. Because the system monitors input in real-time, the user's intended dialog is not always known. Therefore, the dialog host 120 manages several possible dialogs at once, which are represented in the candidate list 150. The dialog host 120 prunes paths in the dialog beam that become irrelevant or outdated and adds new paths as needed. Each candidate is associated with a dialog state. The state may be represented by a data structure. The state data structure may include the question being answered, e.g., taken from the input (e.g., input window). The state data structure may include current conversational context, a history of the user input/requests, system interpretations of the inputs, a history of responses provided to the user, other relevant events, such as incoming notifications, data relevant to task prediction, e.g., data that helps the computing device determine or predict a task the user is desires to accomplish (such as booking a restaurant table), the attentional state of the user (such as a person or place that the current dialog relates to), etc. The state data structure may also include information on type of information being requested for the dialog. For example, a calendar dialog may need a date, a time, an event name, etc. The state data structure may keep track of the types of values needed and whether the values have been provided. The dialog state may also include indications of previous responses accepted system responses (e.g., responses provided to the user). The candidate list 150 is stored in memory and maintained by the dialog host 120. The candidate list 150 represents candidate responses and their corresponding states received from the dialog mixer 130.

A candidate response in the candidate list 150 may be a system response that provides an action to be taken and/or a response to be provided to the user. A candidate response may also be a back-end request to be executed. The back-end request may be associated with a dialog schema, or in other words a particular dialog manager 170. For example, there may be a dialog manager 170a for cooking, a dialog manager 170b for local directions, a dialog manager 170c for music, a dialog manager 170d for time, etc. Dialog manager 170 can thus include any number of different dialog managers (e.g., 170a to 170n). The dialog host 120 may use the ranking engine 122 and/or the triggering engine 124 to determine whether or not to execute the backend request. For example, if the request is to search "cry" in the music schema, this may represent a search unlikely to provide a single response and, thus, represents a waste of resources because the goal of a dialog host is to provide a single relevant response. Alternatively, if the request is to search "cry me a river" in music, the dialog host 120 may decide to execute the request, which will result in a back-end response provided to the dialog host 120. The state data structure may track whether the candidate is a request or response, enabling the dialog host 120 to determine whether requests are outstanding or not.

The dialog host 120 includes a ranking engine 122 and a triggering engine 124. The ranking engine 122 may rank candidate responses provided by the dialog mixer 130. The ranking engine 122 may prune candidate responses with a low posterior probability. In other words, the ranking engine 122 can determine whether a particular candidate response is unlikely to be selected as a good response and be provided to the user. For example, in some implementations, the dialog mixer 130 provides a failure candidate and a backend request candidate for the same dialog manager, e.g., dialog manager 170a, and the ranking engine 122 may rank the failure candidate low and prune the candidate because the backend request has not yet been executed, so the failure candidate is premature. Pruning the candidate means removing the candidate from the list of candidates. In some implementations, the ranking engine 122 preserves the failure candidate until the corresponding backend response is received, but is given a low rank at each ranking event before the corresponding backend response is received.

The ranking engine 122 may include a machine-learned model that takes as input the candidate responses in the candidate list 150 and annotations about the candidate responses and that provides, as output, a rank for each of the candidate responses. In some implementations the ranking model may be a machine-learned model. For example, the ranking model may be a long short-term memory (LSTM) neural network, feed-forward neural network, a support vector machine (SVM) classifier etc., that can predict whether a candidate is likely to be selected for presentation to the user given a set of ranking signals in the form of annotations about the candidates. In some implementations, the ranking model can be trained at a server and provided to the computing device 105. In some implementations, the dialog host 120 may be configured to further train the ranking model from user responses to candidates provided to the user. For example, if a candidate is selected and presented to the user, but the user indicated disapproval, the candidate (and its corresponding state, including annotations) may be marked as a negative training example for the model. Likewise, the system may use responses for which the user indicates approval as positive training examples. The ranking score can be considered a confidence score indicating how confident the model is that the response candidate is a high quality, relevant response.

The annotations can include characteristics of the real-time streaming chunk that are obtained through speech analysis. For example, the annotations may indicate whether the chunk includes upward inflection. As another example, the annotations may indicate whether the speaker has finished speaking, and if so for how long. As another example, the annotations may indicate whether the chunk includes a filter or how much of the chunk is a filter. A filter is a sound that signals the speaker is really pausing. For example, [uhhh] is a verbal filter. As another example, an annotation may indicate the power of the speech, e.g., an indication of whether the speaker is yelling or otherwise conveying frustration. The system may use conventional speech analysis of the chunk to provide the annotations.

The ranking engine 122 may also prune response candidates from the candidate list. The ranking engine 122 may prune a candidate that is too old. The ranking engine 122 may also prune a backend request candidate that is expensive to compute but has little chance of success, e.g., because the search is too broad. The ranking engine 122 may prune a candidate that does not match, e.g., a failure candidate. A failure candidate is a candidate response provided as a default response and indicates the particular dialog manager was unable to understand the request or unable to provide a better response. In general, the system may prune any response candidates that the system is confident will be outranked. The ranking engine 122 may also prune any candidates unlikely to be correct based on new information (e.g., additional input). In other words, once the system is confident in one interpretation, the ranking engine 122 may prune candidate responses relating to the other interpretations.

The dialog host 120 may also include a triggering engine 124. The triggering engine 124 may decide whether to actually provide one of the top candidates as a response to the user, e.g., via the input/output devices 110. When the triggering engine 124 provides a response, it may update a base state for the dialog. The base state represents a state the system has committed to, e.g., a state the system has provided a response for. Thus, once the triggering engine 124 provides a response it may move or promote the provisional state of the candidate provided to the user as a response to the base state. In some implementations the triggering engine 124 may be a machine-learned model. For example, the triggering engine 124 may be a long short-term memory (LSTM) neural network, feed-forward neural network, a support vector machine (SVM) classifier etc., that selects either taking no action or selects a response from among the candidate responses. The triggering engine 124 can select no action, or in other words, no response, as a valid response to a triggering event. Whether the triggering engine 124 selects no action depends on the context of the triggering event and the candidate responses in the candidate list. The triggering engine 124 may also select one of the system response candidates in the candidate list in response to a triggering event. If the model selects a candidate, the triggering engine 124 may provide the selected system response to the input/output devices 110 for presentation to the user. Presentation to the user can involve an action performed by the computing device 105, such as playing audio files, playing video files, providing text on a display, and/or invoking an application. As one example, providing a candidate with a system response of [playing Cry Me a River] may cause the computing system 105 to provide audio output of [playing cry me a river] and to open a media application and begin playing a song titled "Cry Me a River". Depending on the response, providing the candidate as a response may include other actions, such as adding a calendar event, setting a timer, adding a contact, setting an alarm, playing a movie, playing an audio book, etc.

The real-time dialog management system 100 includes a dialog mixer 130. The dialog mixer 130 is configured to take as input a base state and information about a triggering event, e.g., a backend response, new input, passage of time).

The base state includes the current conversational context, including dialog states (e.g., from the state data structure) for all most recently accepted candidates in the path of the dialog beam. The information about the triggering event can include text from the user, e.g. from an input stream window or via a text box, etc. The information about the triggering event can also include the response from a backend request. The information about the triggering event can also include a timestamp for the event.

The dialog mixer 130 provides as output one or more candidate responses. A candidate response can be a system response. A system response is text to be provided as part of the conversation and any actions the system 100 should take. A system response is optional and is not always included in the candidates provided by the dialog mixer 130. A candidate response can also be a backend request the dialog mixer 130 would like the host to execute. The backend request identifies the schema or the dialog manager to which the request is directed as well as the query to be executed. In some implementations the query is processed as a beam search. A backend request is also optional and is now always included in the candidates provided by the dialog mixer 130. However, the dialog mixer 130 provides at least one system response or one backend request for each triggering event. For each candidate response, the dialog mixer 130 also provides a provisional dialog state. The provisional state may use the state data structure discussed herein. The provisional state can be used as part of a base state provided to the dialog mixer 130 in a subsequent call to the dialog mixer 130 if the candidate is accepted. For example, the provisional state provided with a backend request is provided as the base state for a backend response to the backend request. Finally, the dialog mixer 130 also provides, for each candidate response, annotations about the candidates. The annotations are used as signals for ranking and may also be used in logging.

When the dialog mixer 130 is called, it accepts the base dialog states provided in the input. When the triggering event is new input, the dialog mixer 130 determines if the user is triggering a new dialog. A new dialog corresponds to a new dialog manager, e.g., a new schema or a new search in a dialog schema. If the user is triggering a new dialog, the dialog mixer 130 fetches the corresponding schema and initializes the dialog manager for the schema. The dialog mixer 130 then distributes the output of the natural language parser, also referred to as an analyzer, to all dialog managers. When the triggering event is a backend response, the dialog mixer 130 loads the dialog manager that corresponds with the backend response and applies the backend response to the dialog managers that request them, respectively. The dialog mixer 130 may solicit the dialog managers for backend requests and new state tokens. Each dialog manager solicited generates some kind of response, even if it is an error or failure response. In some implementations, the dialog manager 130 may also issue a backend request. The dialog mixer 130 rolls up each dialog manager's output, whether a system response or a backend request, into a response candidate. Each candidate has some combination of a system response(s) and/or a backend request(s), and a provisional dialog state. In some implementations, the dialog mixer 130 may perform second phase candidate generation. In second phase candidate generation the dialog mixer 130 may derive a composite candidate response from two or more individual schemas. The dialog mixer 130 provides the candidate response(s), a respective dialog state for each candidate response, and annotations for each candidate response back to the dialog host 120, where the responses are ranked, pruned, and potentially a response is triggered and provided to the input/output devices 110.

The real-time dialog management system 100 may also include a plurality of dialog managers 170a-170n. Each dialog manager is responsible for a single thread of dialog and represents a searchable schema. For example, dialog manager 170a may be a music dialog for searching a digital library of music. Dialog manager 170b may be a local dialog for searching local areas of interest, e.g., "restaurants near me", and for providing directions to a specific area of interest. Dialog manager 170c may be a calendar dialog capable of finding appointments, setting new appointments, setting reminders for an appointment, etc. Each dialog manager is configured to look at the input provided and determine whether the input matches the schema. For example, the input [take me to] may not be similar enough for a food dialog manager to trigger a search in that schema, but may be similar enough for a local dialog manager and a music dialog manager to trigger and issue backend requests.

The real-time dialog management system 100 may include backend systems 190. The backend systems 190 represent searchable data repositories that provide responses for a particular dialog manager. For example, the music dialog manager 170a may call a music server to search for titles, artists, albums, etc., and can play music from the repository. In some implementations, the repositories are local to the computing device, as illustrated in FIG. 1. In some implementations, the repositories are remote, e.g., located at one or more servers, as illustrated in FIG. 2.

Figure 2:
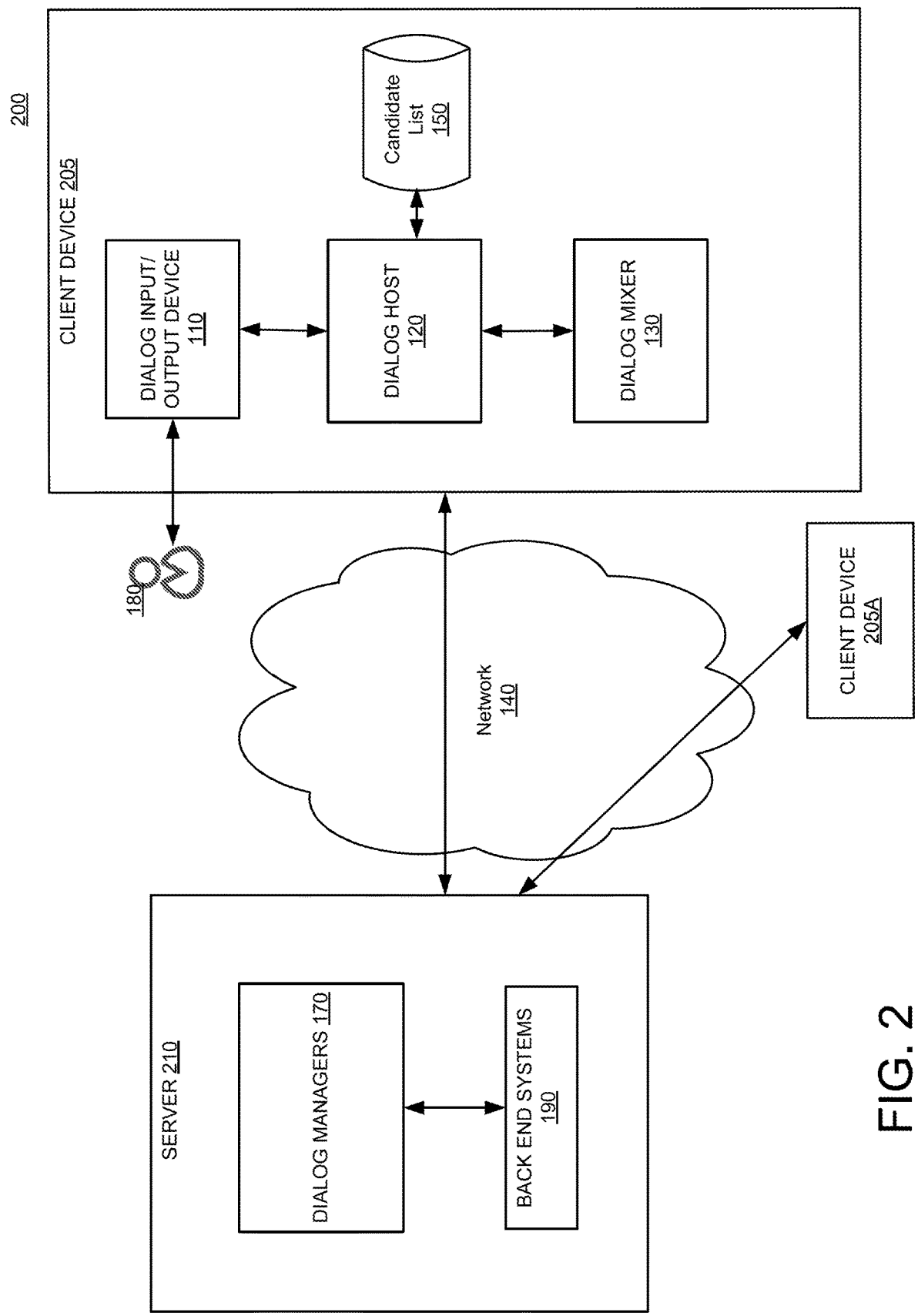
FIG. 2 is a block diagram illustrating another example system in accordance with the disclosed subject matter.
Figure 6:
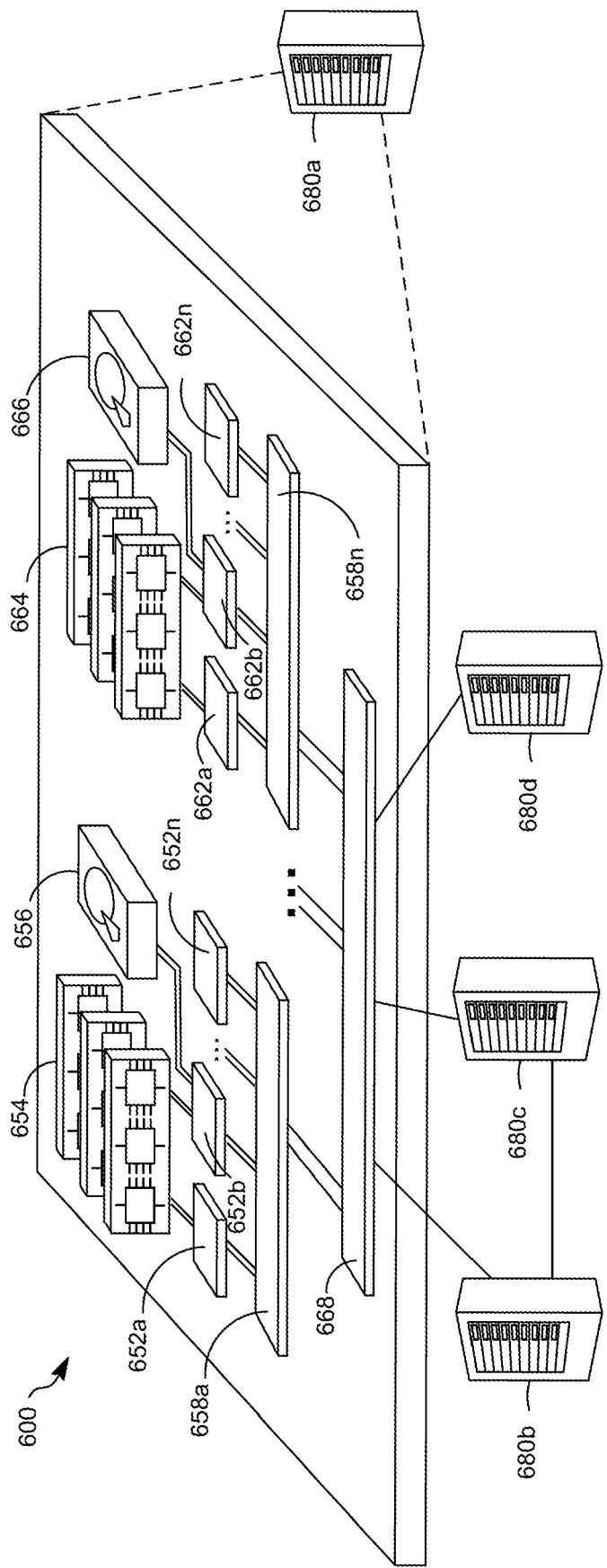
FIG. 6 shows an example of a distributed computer device that can be used to implement the described techniques.

FIG. 2 is a block diagram illustrating another example system 100 in accordance with the disclosed subject matter. In the example of FIG. 2, the real-time dialog management system 100 includes a server 210, which may be a computing device or devices that take the form of a number of different devices, for example a standard server, a group of such servers, or a rack server system. For example, server 210 may be implemented in a distributed manner across multiple computing devices. In addition, server 210 may be implemented in a personal computer, for example a laptop computer. The server 210 may be an example of computer device 500, as depicted in FIG. 5, or system 600, as depicted in FIG. 6. The real-time dialog management system may include client device 205. Client device 205 is similar to client device 105 described with regard to FIG. 1. Thus, client device 205 includes dialog input/output devices 110, dialog host 120, dialog mixer 130, and candidate list 150. In the example of FIG. 2, the server 210 includes the dialog managers 170 and backend systems 190. In the example of FIG. 2 the client device 205 communicates with the server 210 and with other client devices 190 over network 140. Network 140 may be for example, the Internet, or the network 140 can be a wired or wireless local area network (LAN), wide area network (WAN), etc., implemented using, for example, gateway devices, bridges, switches, and/or so forth. Network 140 may also represent a cellular communications network. Via the network 140, the server 210 may communicate with and transmit data to/from client device 205.

The real-time dialog management system 100 of FIG. 1 and of FIG. 2 represents example configurations but implementations may incorporate other configurations. For example, some implementations may have only the backend systems 190 on the server 210, or may have some backend systems 190 on the server 210 and some on the client device 205. Some implementations may have some dialog managers 170 on the client device 205 and some on the server 210. Some implementations may move the dialog mixer 130, or some functionalities of the dialog mixer 130 to the server 210. Some implementations may move the dialog host 120 the server 210. Some implementations may combine one or more of the dialog input/output devices 110, dialog host 120, dialog mixer 130, and dialog managers 170 into a single module or application.

To the extent that the real-time dialog management system 100 collects and stores user-specific data or may make use of personal information, the users may be provided with an opportunity to control whether programs or features collect the user information or to control whether and/or how to receive content that may be more relevant to the user. In addition, certain data may be treated in one or more ways before it is stored or used, so that personally identifiable information is removed. For example, search records may be treated so that no personally identifiable information can be determined and/or a user's geographic location may be generalized where location information is obtained (such as to a city, ZIP code, or state level), so that a particular location of a user cannot be determined. Thus, the user may have control over how information is collected about the user and used by a real-time dialog management system 100.

Figure 3:
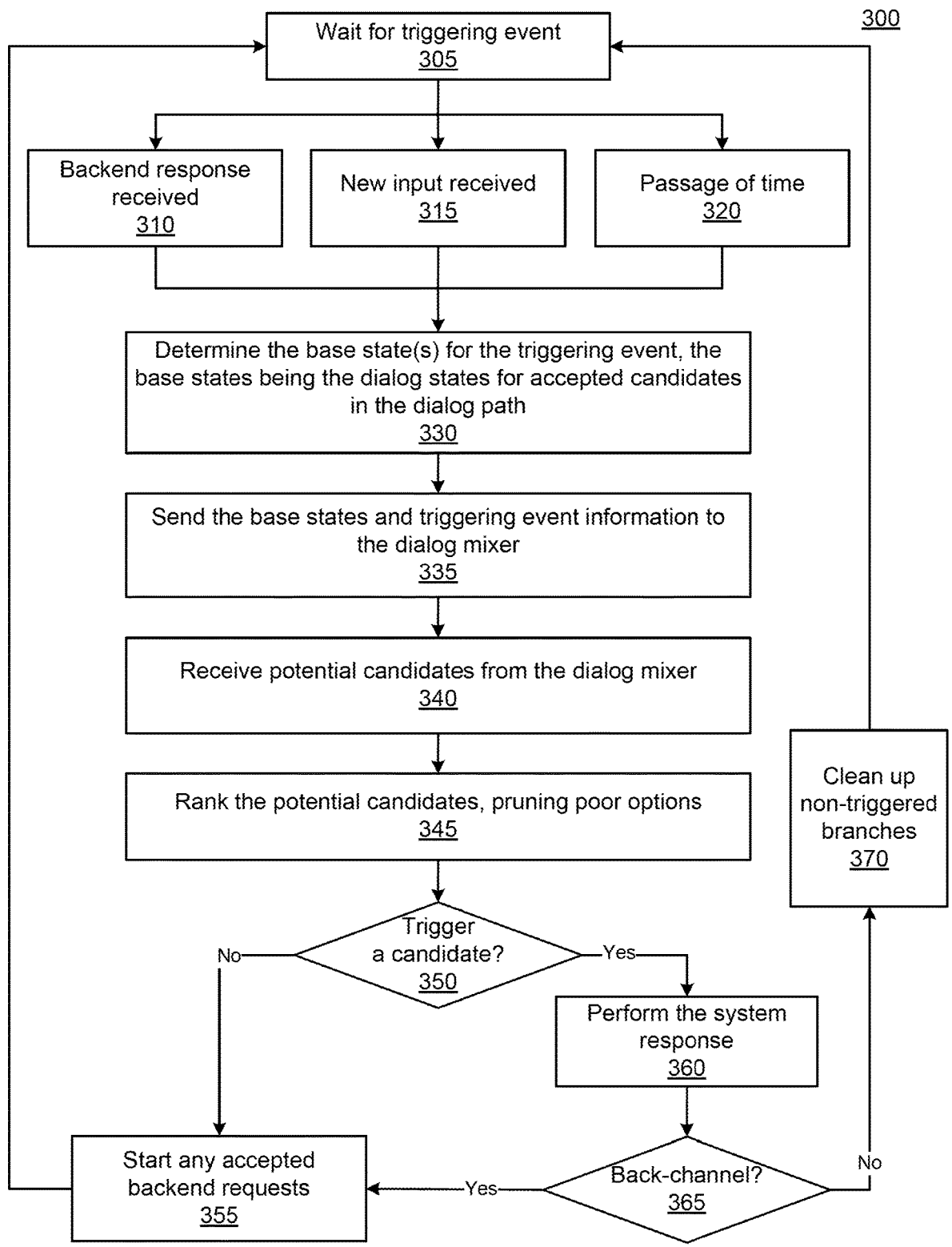
FIG. 3 illustrates a flow diagram of an example process for managing a real-time dialog, in accordance with disclosed implementations.

FIG. 3 illustrates a flow diagram of an example process 300 for managing a real-time dialog, in accordance with disclosed implementations. Process 300 may be performed by a real-time dialog management system, such as system 100 of FIG. 1 or of FIG. 2. In some implementations, process 300 is run by a dialog host, such as dialog host 120. Process 300 may be used to call a dialog mixer in response to a triggering event, determine what input to provide to the dialog mixer, manage a list of candidates from candidates provided by the dialog mixer, and decide whether to provide a candidate response to the user or to stay silent and keep waiting for further input.

Process 300 may represent a main loop for a real-time dialog management system. Thus process 300 may be continually running while the dialog system is active. Process 300 may include a wait mode, where the system waits for a triggering event (305). The wait mode may be interrupted by a triggering event (310-320). One triggering event is receipt of a backend response (310). The backend response is a system response generated by a backend request. The backend response includes the system response and identifies a dialog manager that handled the request. Another triggering event is receipt of new input (315). The input may be speech captured from the user in a sliding window. The input may be text entered by the user. The input may be a selection made by the user. While the user is speaking the system may provide a new input periodically, e.g., every 100 milliseconds. The sliding window may encompass up to a predetermined number of previous inputs. Thus, for example, an initial input for the sliding window may be "play cry" and a next input for the sliding window may be "me a river," making the input for the sliding window "play cry me a river." Another triggering event is passage of time (320). The system may trigger this event when no backend response and no new input has been received within some predefined period of time. This triggering event enables the system to advance the dialog in the absence of other triggering events.

In response to a triggering event, the system may determine the base state for the triggering event (330). The base state describes the current conversational context for a triggering event. The base state may be a single dialog state or multiple dialog states. The base state includes the dialog states of any accepted candidates in the candidate list for a particular dialog path. A system response candidate is accepted when it is triggered, or in other words provided as a response to the user. A backend request candidate is accepted when the backend request is executed. A dialog path starts with a root state and includes any candidates accepted or pending until the system backtracks. Once the system backtracks to an ancestor node in the path, which represents the base state for the new path, the new dialog path diverges from the current path at the ancestor node. The ancestor node may be the root node in the dialog beam but does not need to be the root node.

As part of determining the base state of the triggering event, the system must determine which dialog path corresponds with the triggering event. This may be a current path or may be a new path started because the system decides to backtrack. For example, when additional input changes what the query provided to one or more dialog managers (e.g., the beam search string is updated) the system starts a second dialog path. The dialog path forks, or diverges from the current path at an ancestor node that the system backtracks to. The system can thus manage multiple paths diverging from any base state and can make decisions (e.g., ranking and triggering decisions) between the paths. The system may also prune a path when the candidates in that path become outdated or low-ranked. The dialog states may include an indication of which path the state belongs in. The dialog path can include competing candidates from different dialog managers, so the base state can include more than one dialog state, e.g., a different dialog state for different dialog managers. The dialog state may be stored in a state data structure, which was described above with regard to FIG. 1.

The dialog host may send the base state and the triggering event information to the dialog mixer (335). The triggering event information depends on the type of triggering event. For example, if the triggering event is a backend response, the triggering event information includes the backend response received. If the triggering event is receipt of new input, the triggering event information is the received input, input in a sliding window (the window including the received input), text received, or other input received. If the triggering event is passage of time the input may be a current timestamp.

The system may then receive potential candidates from the dialog mixer. A potential candidate may be a system response. A system response is something that the system says (e.g., provided via an output device) and/or does (e.g., play a song, set a timer, purchase an item, etc.). A potential candidate may be a backend request. A backend request may represent a query in a particular dialog schema. Thus, a backend request may be provided to a dialog manager for the schema. The dialog manager may submit the query to a backend system and formulate a response. Receipt of the response by the dialog host is a triggering event. Thus, a backend request candidate includes an identifier used to match the response to the respective candidate. Each potential candidate has a corresponding provisional dialog state. Each potential candidate may also have respective annotations or metadata that may be used by the system for ranking and pruning potential candidates. The annotations or metadata may also be used in logging.

The system ranks the potential candidates, pruning poor candidates (345). The ranking takes place across all branches, not just the branch that was selected in step 330. The ranking may include a machine learned model that takes as input the annotations and metadata about the potential candidates and returns a score for each potential candidate. The model may be trained to use an input the list of potential candidates, in all branches, their states, and the annotations. The ranking results in some candidates being pruned. A pruned candidate may be removed from the candidate list. A pruned candidate may also be marked as pruned or not active. A candidate may be pruned because it is too old, because it is a duplicate of another candidate, because it is too expensive (e.g., the query is too broad and the user is still speaking,). All of these may result in a poor ranking score, e.g. one that fails to satisfy (e.g., meet or exceed) a ranking threshold. A pruned candidate is no longer considered in the list of candidates, i.e., it is not considered a response candidate.

The system then decides whether to trigger any of the candidates in the list of candidates (350). The triggering decision may also use a machine-learned model that assigns a confidence score for each of the candidates in the list. In some implementations, the confidence score may be the rank assigned to the candidate. The confidence score may represent how certain the system is that the candidate is an appropriate at that time. In other words, the system has uncertainty about whether to provide a candidate response at all. This differs from a turn-taking dialog system where the system always provides one of the candidate responses for a triggering event. In the real-time dialog system, the system is continuously determining whether to respond, with the option not to respond at all being a valid determination. The system may use a variety of input signals to calculate a confidence score for each candidate. The input signals can include whether the last verbal input from the user had an upward intonation. An upward intonation is a factor for indicating the user finished a question. The input signals can include how long the user has been silent. A short silence may mean the user is thinking. A longer silence may indicate the user is awaiting some response or could use help. For example, if the input sliding window is [play the 1978 song by Boston named] the system may have already generated a candidate system response of [playing more than a feeling]. If the user trails off, e.g. is trying to think of the title, the system may trigger the candidate. The input signals may include the length of the sliding window, how long the user has been speaking without triggering a response. If the user has been speaking a while without triggering a response, the system may trigger a back-channel candidate. In some implementations, the list of candidates may include a back-channel feedback candidate as a default candidate. The back-channel candidate represents some feedback by the system that indicates the system is listening but the dialog is primarily one-way, i.e., the user speaking. For example, a back-channel feedback candidate may be [uh-huh], [hmm], or [right] or some other expression that indicates attention or comprehension.

The system may trigger a system response candidate when the system response candidate has a confidence score that satisfies (meets or exceeds) a triggering threshold. The system may also trigger the system response candidate when the system response candidate has a rank that satisfies the triggering threshold. If the system decides not to trigger any response candidate (350, No), the system may initiate, e.g., execute, any backend requests that are candidates and have not already been accepted (355). Any backend requests that are still in the candidate list at this point are accepted. In some implementations, the system may track (e.g., via a flag in the candidate list) which backend requests are outstanding. The system may then return to the wait state (305).

If the system decides to trigger a candidate (350, Yes), the system may perform the system response (360). Only a candidate that is a system response can be triggered because only the system responses have an output to provide to the user. The output may be something provided to an output device, e.g., text spoken or displayed. The output may be an action the computing device performs, e.g., playing a media file. A system response candidate that is triggered is an accepted candidate. If the triggered candidate is a back-channel candidate (365, Yes), the system may initiate any accepted backend requests (355), as explained above, so that the system can wait for the user to keep taking and decide whether to provide a more concrete response later. If the triggered candidate is not a back-channel candidate (365, No), the system may clean up any non-triggered branches (370). This may include setting a new root state or new base state and clearing the list of candidates. The system may then enter the wait state (505) for the next triggering event.

The following is an example real-time dialog to illustrate process 300. In the example, input provided by the user (e.g., via a microphone or keyboard) is illustrated in brackets [ ] as is audio output provided by the system. Actions taken by the system is illustrated in curly braces}. This example is provided for illustrative purposes only. In the present example, the dialog host starts with an empty candidate list, so the root state is null or empty. To begin, the dialog host receives a streaming chunk of [take me to church] as current input, e.g., at 315. Because there are no candidates in the list, the base state is null. Thus, the dialog host sends an empty or null base state and the input "take me to church" to the dialog mixer. The dialog mixer determines that the input applies to two dialog managers; a media dialog manager and a local dialog manager. The dialog mixer provides four potential candidates, as illustrated in Table 1. All candidates Table 1 are in path 1 because they originated from the same base state (e.g., the null state) and search the same input (e.g., "take met to church").

TABLE 1

| Path | Candidate | Dialog State | Dialog Manager | Identifier |
|---|---|---|---|---|
| 1 | LocalSearch("take me to church") | L1 | Local | Local1 |
| 1 | MediaSearch("take me to church") | M1 | Media | Media1 |
| 1 | [Sorry, I can't look up directions] | L2 | Local | Local2 |
| 1 | [Sorry, I can't look up your media.] | M2 | Media | Media2 |

The dialog host ranks the four potential candidates; Local1, Local2, Media1, and Media2. The ranking may occur via a machine learned model that looks at the four candidates and the attributes of each. The model decides that the Local2 and Media2 candidates, which represent failure candidates for the respective dialog managers, are poor candidates because the other two candidates represent backend requests not yet submitted or executed. These two candidates have poor rankings and the dialog host prunes the Local2 and Media2 candidates. Thus the candidate list now includes only the two backend request candidates, i.e., Local1 and Media 1. The dialog host determines that neither candidate is eligible for triggering because they are backend requests and not system responses. If the backend requests have a high enough rank, the dialog host begins executing the Local1 backend request and the Media1 backend request. Beginning execution of a backend requests is acceptance of the candidate. Thus the L1 dialog state and the M1 dialog state are accepted states. The Local1 backend request corresponds to the Local dialog manager, which provides directions and points of interest. The Local1 candidate represents a search for the input (e.g., for take me to church) in the Local schema. Similarly, the Media1 candidate corresponds to a Media dialog manager, which searches a media library. The Media1 candidate represents a search for the input in the Media schema. Once the dialog host begins execution of the two backend requests the dialog host waits for another triggering event.

The next triggering event is the response for the Media1 candidate. In other words, the Media dialog manager returns a result that corresponds to the Media1 request. The dialog host determines that the response corresponds to the Media1 candidate, which is part of path 1, and determines that the base state includes the L1 dialog state and the M1 dialog state. The L1 state is included because the Local search is pending so the L1 dialog state is still active. Thus, the dialog host provides the backend response (a backend response corresponding to the Media1 candidate) and the base state of L1, M1, to the dialog mixer. In response, the dialog mixer provides three potential candidates, as illustrated in Table 2:

TABLE 2

| Path | Candidate | Dialog State | Dialog Manager | Identifier |
|---|---|---|---|---|
| 1 | LocalSearch("take me to church") | L3 | Local | Local3 |
| 1 | [playing take me to church] {play "Take Me To Church"} | M3 | Media | Media3 |
| 1 | [Sorry, I can't look up directions] | L4 | Local | Local4 |

The Media3 candidate is a system response that provides the output [playing take me to church] to the user and initiates an action that causes the media play to begin playing a corresponding media file, audio or video, which is identified in the response. In some implementations, the dialog host replaces the Media1 candidate in the candidate list with the Media3 candidate because the Media3 candidate is the response received by executing the request represented by the Media1 candidate. In some implementations, the Media1 candidate is marked as completed but remains active. The dialog host prunes the Local3 candidate because it is a duplicate of the Local 1 candidate, which is still executing. In some implementations, the dialog mixer may recognize that the Local3 candidate is a duplicate and may not provide Local3 as a potential candidate. The dialog host ranks the Local4 candidate poorly because the Local 1 request is still executing. Thus, the dialog host prunes the Local4 candidate. This leaves Local1 and Media3 in the candidate list. Media3 is a system response eligible for triggering, but the Media3 candidate has a low rank because the user is still speaking, the user did not have an explicit play intent, i.e., the input was not [play take me to church], and there is an outstanding request. The dialog host therefore decides not to respond and does not trigger the Media3 response. This means the Media3 candidate is not accepted; rather the Media3 candidate is pending. There are no backend requests to execute, so the dialog host waits for another triggering event.

The next triggering event is the arrival of another streaming chunk. The next input is a streaming chunk of [take me to church by bicycle]. This streaming chunk represents a sliding window that includes the previous input. The dialog host determines that the new input should be a new beam search. In other words, the dialog host determines that the query is more specific and starts a second path in the dialog beam. The base state for the new path is empty, i.e., the system backtracks to the root state and begins a new path from the root with the new search criteria of "take me to church by bicycle". Thus, the dialog host sends an empty or null base state and the input "take me to church by bicycle" to the dialog mixer. The dialog mixer determines that the input applies to the Local dialog manager. The dialog mixer does not trigger the Media dialog manager because the input does not sound like a media request. Thus, the dialog mixer provides two potential candidates, as illustrated in Table 3. These candidates are included in the candidate list with the still active and pending candidates from the first path:

TABLE 3

| Path | Candidate | Dialog State | Dialog Manager | Identifier |
|---|---|---|---|---|
| 2 | LocalSearch("take me to church by bicycle") | $L_B1$ | Local | $Local_B1$ |
| 2 | [Sorry, I can't look up directions] | $L_B2$ | Local | $Local_B2$ |
| 1 | [playing take me to church] {play "Take Me To Church"] | M3 | Media | Media3 |
| 1 | LocalSearch("take me to church") | L1 | Local | Local1 |

The dialog host ranks the four candidates; Local1, $Local_B1$, Media3, and $Local_B2$. The rank of the $Local_B2$ candidate is poor and the dialog host prunes the candidate because the $Local_B1$ search has not yet provided a response or timed out. The Media3 candidate does not trigger because it is not responsive to the input, e.g., it is for path 1 and not path 2. The dialog host therefore does not have any system response to trigger and begins executing the request for the $Local_B1$ candidate. Thus, the $L_B1$ dialog state is an accepted state in path 2 and the dialog manager waits for the next triggering event.

The next triggering event is the response that corresponds to the Local1 backend request. The dialog host may determine that this response corresponds to the Local1 candidate and is in path 1 and not path 2. Thus, the dialog host determines that the base state includes the L1 dialog state and the M1 dialog state, which are the most recent accepted states in path 1. The M3 dialog state is not an accepted state because the candidate has not been triggered. This base state is provided with the backend response to the dialog mixer. The dialog mixer provides three candidates in response. The three candidates are added to the candidate list, which is illustrated in Table 4:

TABLE 4

| Path | Candidate | Dialog State | Dialog Manager | Identifier |
|---|---|---|---|---|
| 2 | LocalSearch("take me to church by bicycle") | $L_B1$ | Local | $Local_B1$ |
| 1 | [Sorry, I can't look up your media] | M5 | Local | Media5 |
| 1 | [playing take me to church] {play "Take Me To Church"} | M3 | Media | Media3 |
| 1 | MediaSearch("take me to church") | M4 | Local | Media4 |
| 1 | [here are directions by car to Church of Turning] | L5 | Local | Local5 |

The dialog host ranks the Media4 candidate low and prunes the candidate because it is a duplicate. In some implementations, the dialog mixer may recognize that this candidate is a duplicate of the accepted candidate Media1 and may not even provide Media4 as a candidate. The dialog host also ranks the Media5 candidate low and prunes that candidate. The Local5 and Media3 candidates are system responses, but may have low ranks because there is still a pending backend request (e.g., $Local_B1$). Thus the L5 dialog state is not yet an accepted state. The dialog host thus chooses to do nothing in response to the triggering event and waits for a next triggering event.

The next triggering event is the response that corresponds to the $Local_B1$ backend request. The dialog host may determine that this response corresponds to the $Local_B1$ candidate and is in path 2 and not path 1. Thus, the dialog host determines that the base state includes the $L_B1$ dialog state, which is the most recent accepted state in path 2. The L1 and M1 states are not associated with path 2 and are therefore not included in the base state provided to the dialog mixer. This base state is provided with the backend response to the dialog mixer. The dialog mixer provides one candidate in response. The candidate are added to the candidate list, which is illustrated in Table 5:

TABLE 5

| Path | Candidate | Dialog State | Dialog Manager | Identifier |
|---|---|---|---|---|
| 2 | [here are directions by bike to Church of Turning] | $L_B3$ | Local | $Local_B3$ |
| 1 | [playing take me to church] {play "Take Me To Church} | M3 | Media | Media3 |
| 1 | [here are directions by car to Church of Turning] | L5 | Local | Local5 |

The dialog host may rank the $Local_B3$ candidate highly because it is responsive to the whole query and the system may have metadata that indicates the user has finished speaking, etc. The Local5 candidate is lower ranked because it does not take into account the entire query and the Media3 candidate is poorly ranked. The dialog host decides to trigger the LocalB3 candidate. Triggering the $Local_B3$ candidate causes the system to update the base state for the dialog beam to the $L_B3$ dialog state, e.g., making the $L_B3$ dialog state a root state and to output the response and execute its corresponding action.

Figure 4:
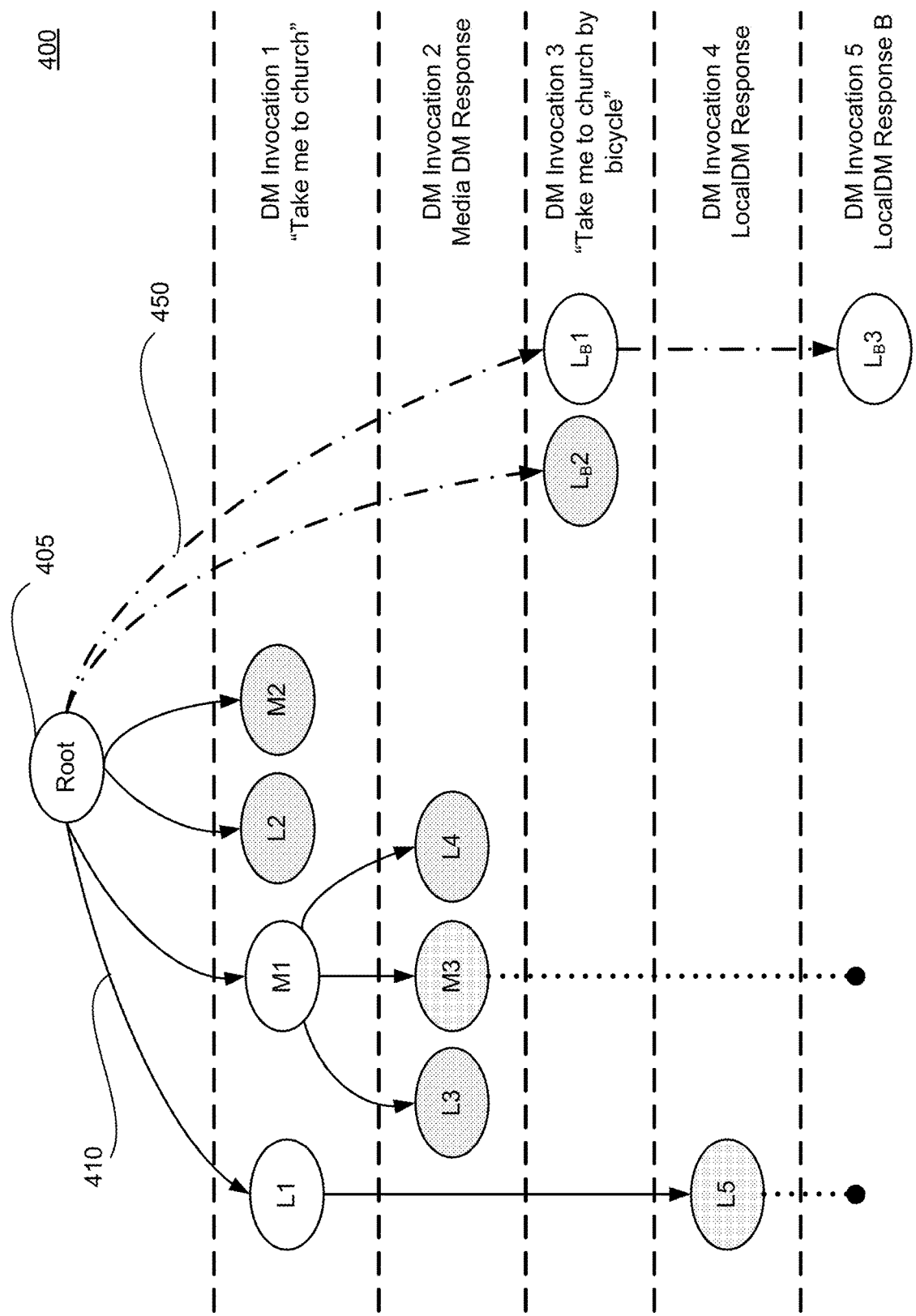
FIG. 4 is a block diagram illustrating an example real-time dialog beam managed by a dialog host in accordance with the disclosed subject matter.

FIG. 4 is an example block diagram illustrating the dialog beam 400 for the example presented above. The tree starts with a root dialog state 405 that is empty. In other words there are no pending requests or responses and the candidate list is empty. The first triggering event, DM trigger 1, results in the four dialog states illustrated from Table 1. Two of the dialog states (L2 and M2) are pruned and the other two (L1 and M1) are accepted. All four states are part of path 1, which is illustrated in FIG. 4 as solid lines 410. The second triggering event, DM Trigger 2, results in three more dialog states, two of which (L3 and L4) are pruned and one of which (M3) is kept, but not accepted. Thus M3 is a pending dialog state. The next triggering event, DM trigger 3, causes the system to backtrack and start a new path, which is illustrated with the dotted and dashed line 450 in FIG. 4. The DM trigger 3 results in two new dialog states, one of which is pruned ($L_B2$) and one of which is accepted ($L_B1$). The next triggering event, DM trigger 4, applies to the first path and results in a new dialog state L5 that is kept but not yet accepted. The L5 dialog state is pending. The next triggering event, DM trigger 5, applies to the second path and results in a new dialog state, $L_B3$, that is accepted. The acceptance of the $L_B3$ dialog state causes the pending dialog states of the first path, i.e., L5 and M3, to be pruned.

FIG. 5 shows an example of a generic computer device 500, which may be operated as server 110, and/or client 150 of FIG. 1, which may be used with the techniques described here. Computing device 500 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 500 includes a processor 502, memory 504, a storage device 506, and expansion ports 510 connected via an interface 508. In some implementations, computing device 500 may include transceiver 546, communication interface 544, and a GPS (Global Positioning System) receiver module 548, among other components, connected via interface 508. Device 500 may communicate wirelessly through communication interface 544, which may include digital signal processing circuitry where necessary. Each of the components 502, 504, 506, 508, 510, 540, 544, 546, and 548 may be mounted on a common motherboard or in other manners as appropriate.

The processor 502 can process instructions for execution within the computing device 500, including instructions stored in the memory 504 or on the storage device 506 to display graphical information for a GUI on an external input/output device, such as display 516. Display 516 may be a monitor or a flat touchscreen display. In some implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk. In some implementations, the memory 504 may include expansion memory provided through an expansion interface.

The storage device 506 is capable of providing mass storage for the computing device 500. In one implementation, the storage device 506 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 504, the storage device 506, or memory on processor 502.

The interface 508 may be a high speed controller that manages bandwidth-intensive operations for the computing device 500 or a low speed controller that manages lower bandwidth-intensive operations, or a combination of such controllers. An external interface 540 may be provided so as to enable near area communication of device 500 with other devices. In some implementations, controller 508 may be coupled to storage device 506 and expansion port 514. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 530, or multiple times in a group of such servers. It may also be implemented as part of a rack server system. In addition, it may be implemented in a computing device, such as a laptop computer 532, personal computer 534, or tablet/smart phone 536. An entire system may be made up of multiple computing devices 500 communicating with each other. Other configurations are possible.

FIG. 6 shows an example of a generic computer device 600, which may be server 110 of FIG. 1, which may be used with the techniques described here. Computing device 600 is intended to represent various example forms of large-scale data processing devices, such as servers, blade servers, datacenters, mainframes, and other large-scale computing devices. Computing device 600 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 600 may include any number of computing devices 680. Computing devices 680 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 680a includes multiple racks 658a-658n. Each rack may include one or more processors, such as processors 652a-652n and 662a-662n. The processors may include data processors, network attached storage devices, and other computer controlled devices. In some implementations, one processor may operate as a master processor and control the scheduling and data distribution tasks. Processors may be interconnected through one or more rack switches 658, and one or more racks may be connected through switch 678. Switch 678 may handle communications between multiple connected computing devices 680.

Each rack may include memory, such as memory 654 and memory 664, and storage, such as 656 and 666. Storage 656 and 666 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 656 or 666 may be shared between multiple processors, multiple racks, or multiple computing devices and may include a computer-readable medium storing instructions executable by one or more of the processors. Memory 654 and 664 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 654 may also be shared between processors 652a-652n. Data structures, such as an index, may be stored, for example, across storage 656 and memory 654. Computing device 680 may include other components not shown, such as controllers, buses, input/output devices, communications modules, etc.

An entire system, such as system 100, may be made up of multiple computing devices 680 communicating with each other. For example, device 680a may communicate with devices 680b, 680c, and 680d, and these may collectively be known as system 100. As another example, system 100 of FIG. 1 may include one or more computing devices 680. Some of the computing devices may be located geographically close to each other, and others may be located geographically distant. The layout of system 600 is an example only and the system may take on other layouts or configurations.

According to certain aspects of the disclosure, a mobile device includes at least one processor and memory storing instructions that, when executed by the at least one processor, cause the computing device to perform operations. The operations include generating first candidate responses to a triggering event. The triggering event may be receipt of a live-stream chunk for the dialog or receipt of a backend response to a previous backend request for a dialog schema. The operations also include updating a list of candidate responses that are accepted or pending with at least one of the first candidate responses, and determining, for the triggering event, whether the list of candidate responses includes a candidate response that has a confidence score that meets a triggering threshold. The operations also include waiting for a next triggering event without providing a candidate response when the list does not include a candidate response that has a confidence score that meets the triggering threshold.

These and other aspects can include one or more of the following features. For example at least one of the first candidate responses may have a highest rank of the first candidate responses. As another example, each candidate in the candidate list may be either a system response or a backend request and each candidate in the candidate list has a respective dialog state and is associated with a path in a dialog beam. As another example, the pending candidate responses can be system responses that have not been provided in response to a triggering event and the operations also include determining a path in a dialog beam the triggering event corresponds to, determining a base state for the triggering event; the base state including dialog states of accepted candidates in the candidate list for the path, and generating the first candidate responses using information from the triggering event and the base state. As another example, one of the candidate responses in the list of candidate responses may represent back-channel feedback. As another example, an accepted response may be a backend request that has been initiated. As another example, a pending response is a system response not provided to the user. As another example, the triggering event is a first triggering event and the candidates in the list of candidates all correspond to a first path in a dialog beam and the operations also include receiving a second triggering event, determining that the second triggering event requires a second path in a dialog beam, setting a base state for the second path, the base state for the second path being a base state for an ancestor node in the first path of a current base state of the first path, generating second candidate responses using the base state for the second path and information for the second triggering event, and updating the list of candidate responses that are accepted or pending with at least one of the second candidate responses. As another example, updating the list can include pruning candidate responses that fail to satisfy a ranking threshold.

In another aspect, a method includes providing, responsive to receiving a chunk from a real-time dialog stream, the chunk to a dialog mixer, receiving response candidates for the chunk from the dialog mixer, each response candidate being a system response for a dialog schema or a backend request for a dialog schema, and update a rotating list of response candidates using at least one of the response candidates for the chunk. The method further includes ranking the response candidates in the list, each response candidate having a respective confidence score, determining whether the rotating list includes a response candidate with a confidence score that satisfies a triggering threshold, and when the rotating list does not include a response candidate with a confidence score that satisfies the triggering a threshold, initiating a backend request represented by a response candidate in the list that has a confidence score that satisfies a ranking threshold and that is not yet an accepted dialog state.

These and other aspects can include one or more of the following features. For example, each response candidate in the list may have respective annotations and a respective dialog state and ranking the response candidates can include providing the annotations with the list to a machine learned model, the machine learned model using the annotations and the response candidates in the list to determine the respective confidence scores. In such implementations, the annotations can include characteristics of the chunk obtained through speech analysis. As another example, each response candidate in the list of response candidates may have a corresponding dialog state. As another example, the method may also include updating the response candidates in the list includes pruning candidates with a confidence score that fails to satisfy a ranking threshold. As another example, each response candidate in the list of response candidates may have a corresponding dialog state and is assigned to a path in a dialog beam, the dialog beam including at least two paths. In such implementations, when the rotating list does include a response candidate with a confidence score that satisfies the triggering threshold, the method may also include determining a path associated with the response candidate with the confidence score that satisfies the triggering threshold and pruning response candidates from the list that are not associated with the path.

In another aspect a method includes receiving a triggering event for a real-time dialog, the real-time dialog having an associated dialog beam with a first path, the dialog beam representing dialog states for a real-time dialog with a user, determining that the triggering event starts a new path in the dialog beam, and backtracking in the first path to an ancestor node in the dialog beam. The method also includes starting the new path in the dialog beam from the ancestor node by generating response candidates using a base state represented by the ancestor node and information from the triggering event, where a path in the dialog beam includes one or more accepted or pending response candidates, a response candidate being a system response generated by a dialog schema or a backend request for a dialog schema.

These and other aspects can include one or more of the following features. For example, the ancestor node may be a root node that represents a blank base state. As another example, the response candidate may have a respective dialog state and is assigned to one of the dialog paths. As another example, the method might also include determining, responsive to a second triggering event, that a response candidate in the new path is a system response with a confidence score that satisfies a triggering threshold, providing the response candidate to the user, and pruning the first path from the dialog beam.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed:

1. A method implemented by one or more processors, the method comprising:
   receiving, during a real-time dialog that is between a user and a system and that is via a computing device of the user, a chunk from a real-time dialog stream;
   providing the chunk to a dialog mixer;
   receiving current system response candidates for the chunk from the dialog mixer, the current system response candidates including:
      a non-back-channel candidate that, when triggered, sets a new base state for the real-time dialog, and
      a back-channel feedback candidate that, when triggered causes feedback, that represents that the system is listening, to be provided, and without setting any new base state for the real-time dialog;
   determining to trigger the back-channel feedback candidate in lieu of other of the current system response candidates; and
   in response to determining to trigger the back-channel feedback candidate:

causing the feedback, that represents that the system is listening, to be provided to the user via the computing device.

2. The method of claim 1, wherein the back-channel feedback candidate is an expression that indicates attention or comprehension.

3. The method of claim 2, wherein the back-channel feedback candidate is "uh-huh", "hmm", or "right".

4. The method of claim 1, wherein determining to trigger the back-channel feedback candidate in lieu of other of the current system response candidates comprises:
determining to trigger the back-channel feedback candidate based on whether a last verbal input from the user had an upward intonation.

5. The method of claim 1, wherein determining to trigger the back-channel feedback candidate in lieu of other of the current system response candidates comprises:
determining to trigger the back-channel feedback candidate based on how long the user has been silent.

6. The method of claim 1, wherein determining to trigger the back-channel feedback candidate in lieu of other of the current system response candidates comprises:
determining to trigger the back-channel feedback candidate based on how long the user has been talking.

7. The method of claim 1, further comprising:
in response to determining to trigger the back-channel feedback candidate:
initiating an accepted backend request.

8. A method implemented by one or more processors, the method comprising:
receiving a user request from a user during a current dialog between the user and a dialog host;
generating, based on the user request, multiple candidate dialog paths each corresponding to at least one respective searchable dialog schema of multiple searchable dialog schemas;
providing, for presentation to the user at an output device, a response, to the user request, that continues the dialog between the user and the dialog host, wherein the response is associated with a first candidate dialog path of the multiple candidate dialog paths;
determining that a period of time has passed without receiving any new input responsive to the response;
in response to determining that the period of time has passed without receiving any new input responsive to the response:
generating multiple candidate dialog states based on the multiple searchable dialog schemas;
updating the multiple candidate dialog paths based on the multiple candidate dialog states;
determining that a particular updated candidate dialog path, of the updated multiple candidate dialog paths, is associated with a system response; and
in response to determining that the particular updated candidate dialog path is associated with the system response:
performing the system response via the output device.

9. The method of claim 8, further comprising:
determining that the system response, associated with the particular updated candidate dialog path, has a confidence score that satisfies a triggering threshold;
wherein providing the system response is further in response to determining that the system response satisfies the triggering threshold.

10. The method of claim 8, wherein performing the system response via the output device comprises:
causing text or spoken output of the system response to be rendered at the output device.

11. The method of claim 8, wherein performing the system response via the output device comprises causing media to be played at the output device.

12. The method of claim 8, further comprising:
in response to determining that the particular updated candidate dialog path is associated with the system response:
pruning other of the updated multiple candidate dialog paths.

13. The method of claim 12, further comprising:
in response to determining that the particular updated candidate dialog path is associated with the system response:
monitoring for a next triggering event.

14. The method of claim 8, wherein at least one of the candidate dialog states is associated with two or more of the multiple searchable dialog schemas.

15. A computing device configured to manage a real-time dialog with a user, the computing device comprising:
an output device;
one or more processors; and
memory storing instructions that, when executed by one or more of the processors, cause the computing device to:
receive a first user request from a user during a current dialog between the user and a dialog host;
generate, based on the first user request, multiple candidate dialog paths each corresponding to at least one respective searchable dialog schema of multiple searchable dialog schemas;
provide, for presentation to the user at the output device, a first response to the first user request that continues the dialog between the user and the dialog host, wherein the first response is associated with a first candidate dialog path of the multiple candidate dialog paths;
determine that a period of time has passed without receiving any new input responsive to the first response;
in response to determining that the period of time has passed without receiving any new input responsive to the first response:
generate multiple candidate dialog states based on the multiple searchable dialog schemas, wherein at least one of the candidate dialog states is associated with two or more of the multiple searchable dialog schemas;
update the multiple candidate dialog paths based on the multiple candidate dialog states;
determine that a particular updated candidate dialog path, of the updated multiple candidate dialog paths, is associated with a system response; and
in response to determining that the particular updated candidate dialog path is associated with the system response:
perform the system response via the output device.

16. The computing device of claim 15, wherein the instructions, when executed by one or more of the processors, further cause the computing device to:
determine that the system response, associated with the particular updated candidate dialog path, has a confidence score that satisfies a triggering threshold;
wherein in providing the system response, the computing device is to provide the system response further in response to determining that the system response satisfies the triggering threshold.

17. The computing device of claim 15, wherein in performing the system response via the output device the computing device is to:
   cause text or spoken output of the system response to be rendered via the output device.

18. The computing device of claim 15, wherein in performing the system response via the output device the computing device is to:
   cause media to be played at the output device.

19. The computing device of claim 15, wherein the instructions, when executed by one or more of the processors, further cause the computing device to:
   in response to determining that the particular updated candidate dialog path is associated with the system response:
      prune other of the updated multiple candidate dialog paths.

20. The computing device of claim 19, wherein the instructions, when executed by one or more of the processors, further cause the computing device to:
   in response to determining that the particular updated candidate dialog path is associated with the system response:
   monitor for a next triggering event.

\* \* \* \* \*